United States Patent [19]
Hwang

[11] Patent Number: 5,486,881
[45] Date of Patent: Jan. 23, 1996

[54] UNIQUE OPTICAL PROJECTION SYSTEM

[75] Inventor: Jin Hwang, Incheon, Rep. of Korea

[73] Assignee: Daewoo Electronics Co., Ltd., Seoul, Rep. of Korea

[21] Appl. No.: 401,324

[22] Filed: Mar. 9, 1995

[30] Foreign Application Priority Data

Mar. 9, 1994 [KR] Rep. of Korea .................. 944521

[51] Int. Cl.$^6$ ................................... G03B 21/28
[52] U.S. Cl. ................... 353/34; 353/31; 353/37; 348/771
[58] Field of Search .................... 353/31, 34, 37, 353/97; 348/770, 771

[56] References Cited

U.S. PATENT DOCUMENTS

| | | | |
|---|---|---|---|
| 3,989,890 | 11/1976 | Natherson et al. | 348/771 |
| 5,108,172 | 4/1992 | Flasck | 353/31 |
| 5,245,369 | 9/1993 | Um et al. | 353/99 |
| 5,379,081 | 1/1995 | Kim | 353/99 |
| 5,420,655 | 5/1995 | Shimizu | 353/34 |

Primary Examiner—William C. Dowling
Attorney, Agent, or Firm—Anderson Kill Olick & Oshinsky

[57] ABSTRACT

An optical projection system comprises a non-point white light source, a source lens, a source stopper, an optical means including a first and a second dichroic mirrors, a first, a second and a third arrays of M×N actuated mirrors, a first, a second and a third field lenses, a projection stopper, a projection lens and a projection screen. Each of the field lenses is located between each of the dichroic mirrors and each of the arrays of actuated mirrors and is used for collimating each of the primary light beams onto the corresponding array of actuated mirrors and refocussing each of the reflected primary light beams from the arrays of actuated mirrors onto the optical means and eventually onto the projection stopper. The first dichroic mirror in the optical means comprises a first and a second portions, wherein the first portion is used for isolating and transmitting one of the primary light beams to the first array of actuated mirrors and reflecting the two remaining primary beams to the second dichroic mirror, and the second portion is used for reflecting and transmitting each of the primary beams reflected from each of the arrays of actuated mirrors.

4 Claims, 3 Drawing Sheets

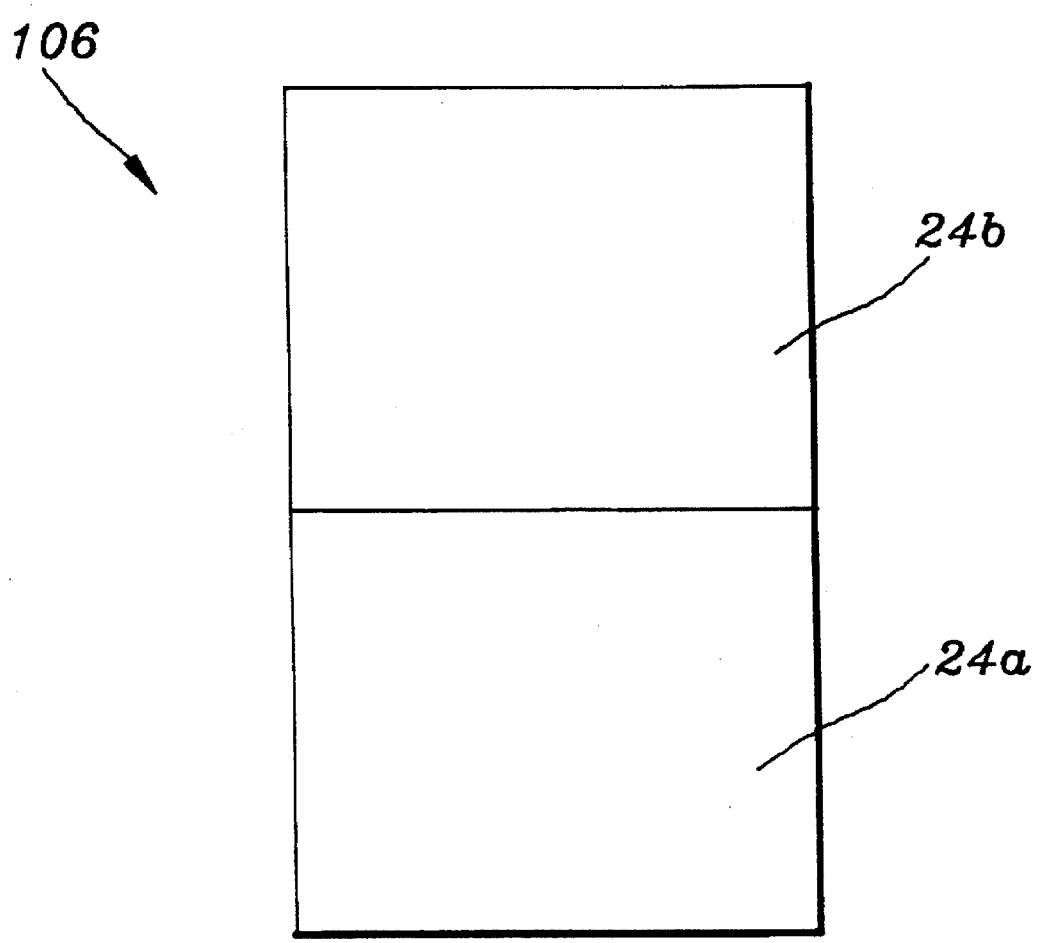

5,486,881

UNIQUE OPTICAL PROJECTION SYSTEM

FIELD OF THE INVENTION

The present invention relates to an optical projection system; and, more particularly, to an unique optical projection system having a novel optical baffling means.

BACKGROUND OF THE INVENTION

Among the various video display systems available in the art, an optical projection system is known to be capable of providing high quality images in a large scale.

In FIG. 1, there is illustrated a prior art optical projection system 100 comprising non-point white light source 1, a Schlieren bar 2 provided with a plurality of reflective surfaces and corresponding number of slits, a source lens 3, a projection lens 4, a field lens system 5, a projection screen 6, a beam splitting means 7 including a first and a second dichroic mirrors 8, 9, and first, second and third arrays 10, 11, 12 of M×N actuated mirrors 13.

In such a system, a white light emanating from the non-point white light source 1 is focussed along a first optical light path onto the reflective surfaces of the Schlieren bar 2 by the source lens 3, wherein the white light consists of a first, a second and a third primary light beams, each of the primary light beams being one of the primary colors. The reflective surfaces of the Schlieren bar 2 are in a facing relationship with the source lens 3 and the field lens system 5. The white light reflected from each of the reflective surfaces diverges along a second optical path and is collimated by the field lens system 5, thereby being uniformly illuminated onto the beam splitting means 7 including the first and second dichroic mirrors 8,9, wherein the first dichroic mirror 8 is disposed between the field lens system 5 and the second dichroic mirror 9 facing the first array 10 of M×N actuated mirrors 13, and the second dichroic mirror 9, between the first dichroic mirror 8 and the third array 12 of M×N actuated mirrors 13 facing the second array 11 of M×N actuated mirrors 13. The first dichroic mirror 8 receives the white light from the field lens system 5, reflects the first primary light beam of the white light to the first array 10 of M×N actuated mirrors 13, and transmits the second and third primary light beams to the second dichroic mirror 9, which, in turn, receives the second and third primary light beams from the first dichroic mirror 8, reflects the second primary light beam to the second array 11 of M×N actuated mirrors 13, and transmits the third primary light beam to the third array 12 of M×N actuated mirrors 13. Each of the actuated mirrors 13 of the arrays 10, 11, 12 corresponds to each of the pixels to be displayed.

The optical path of the reflected primary light beams from each of the actuated mirrors 13 in each of the arrays 10, 11, 12 is determined by the amount of deflection thereof.

The reflected primary light beams from each of the undeflected actuated mirrors in each of the arrays 10, 11, 12 are focussed back to the Schlieren bar 2 by the field lens system 5 via the first and second dichroic mirrors 8, 9 along the second optical path and stopped by the reflective surfaces thereof, whereas the reflected primary light beams from each of the deflected actuated mirrors in each of the arrays 10, 11, 12 are focussed back to the Schlieren bar 2 by the field lens system 5 via the first and second dichroic mirrors 8, 9 along a third optical path so that a portion of the focussed light beams passes the slits thereof. The primary light beams from each of the actuated mirrors 13 in each of the arrays 10, 11, 12 which pass through the slits are transmitted to the projection lens 4 which projects the transmitted primary light beams from each of the actuated mirrors 13 in each of the arrays 10, 11, 12 on the projection screen 6, thereby displaying each of the pixels corresponding thereto.

One of the major shortcomings of the above-described optical projection system 100 arises from the use of the Schlieren bar 2. Since the white light emanating from the non-point light source 1 is focussed onto the reflective surfaces of the Schlieren bar 2 at a fixed angle, the reflected white light therefrom is extremely divergent and has a large beam diameter, and in order to uniformly illuminate such a white light onto the beam splitting means 7 and onto the arrays 10, 11, 12 of M×N actuated mirrors 13 and then refocus the reflected light from the arrays 10, 11, 12 of M×N actuated mirrors 13 to the Schlieren bar 2, the field lens system 5 employed therein must become extremely complicated.

SUMMARY OF THE INVENTION

It is, therefore, a primary object of the present invention to provide an optical projection system without using a Schlieren bar, thereby eliminating a need to provide a complicated field lens system therefor.

In accordance with the present invention, there is provided an optical projection system capable of displaying an M×N number of pixels, wherein M and N are integers, comprising: a non-point white light source for emitting a white light along a first optical path on a first optical plane, wherein the white light consists of a first, second and a third primary light beams, each of the primary light beams being one of the primary colors; a trinity of arrays of M×N actuated mirrors, including a first, a second and a third arrays of M×N actuated mirrors, each of the actuated mirrors having an actuator and a mirror attached thereto, each of the actuated mirrors in the arrays being capable of changing the optical path of the primary light beams reflected therefrom; a source stopper, provided with a light transmitting portion having a specific configuration and a light stopping portion and being placed on the first optical path on the first optical plane, for shaping the white light from the non-point white light source into a predetermined configuration; a source lens, disposed between the source stopper and the non-point white light source, for focussing the white light emitted by the non-point white light source onto the source stopper; an optical means including a first and a second dichroic mirrors, for isolating each of the primary light beams in the white light from the source stopper and illuminating each of the primary light beams to the corresponding array of actuated mirrors, wherein the first dichroic mirror, disposed between the source stopper and the first array of actuated mirrors facing the second dichroic mirror, is used for isolating one of the primary light beams, transmitting thereof to the first array of actuated mirrors and reflecting the remaining two primary light beams onto the second dichroic mirror disposed between the first dichroic mirror and the third array of actuated mirrors facing the second array of actuated mirrors, and the second dichroic mirror, upon receiving the remaining two primary light beams from the first dichroic mirror, isolates one of the two remaining primary light beams, reflects the isolated primary light beams onto the second array of actuated mirrors and transmits the remaining primary light beam to the third array of actuated mirrors; a trinity of field lenses including a first, a second and third field lenses, each of the first, second and third field lenses being located between the first dichroic mirror and the first array of actuated mirrors, between the second dichroic mirror and the second array of actuated mirrors, and between the second dichroic mirror and the third array of actuated mirrors, respectively, wherein each of the field lenses is used for collimating each of the primary light beams onto the corresponding array of actuated mirrors and for refocussing each of the primary light beams reflected from each of the actuated mirrors in each of the arrays; a projection screen for displaying an image made of the M×N number of pixels thereon; a projection stopper, provided with a light transmitting portion and a light stopping portion, for passing a predetermined amount of the reflected primary light beams from the trinity of the arrays of M×N actuated mirrors; and a projection lens for projecting the primary light beams from the projection stopper onto the projection screen, thereby displaying each of the pixels corresponding thereto.

BRIEF DESCRIPTION OF THE DRAWINGS

The present invention together with the above and other objects and advantages will become apparent from the following description of preferred embodiments given in conjunction with the accompanying drawings, wherein:

FIG. 3 shows a schematic view of the first dichroic mirror used in the optical means shown in FIG. 2.

DETAILED DESCRIPTION OF THE PREFERRED EMBODIMENTS

Figure 1:
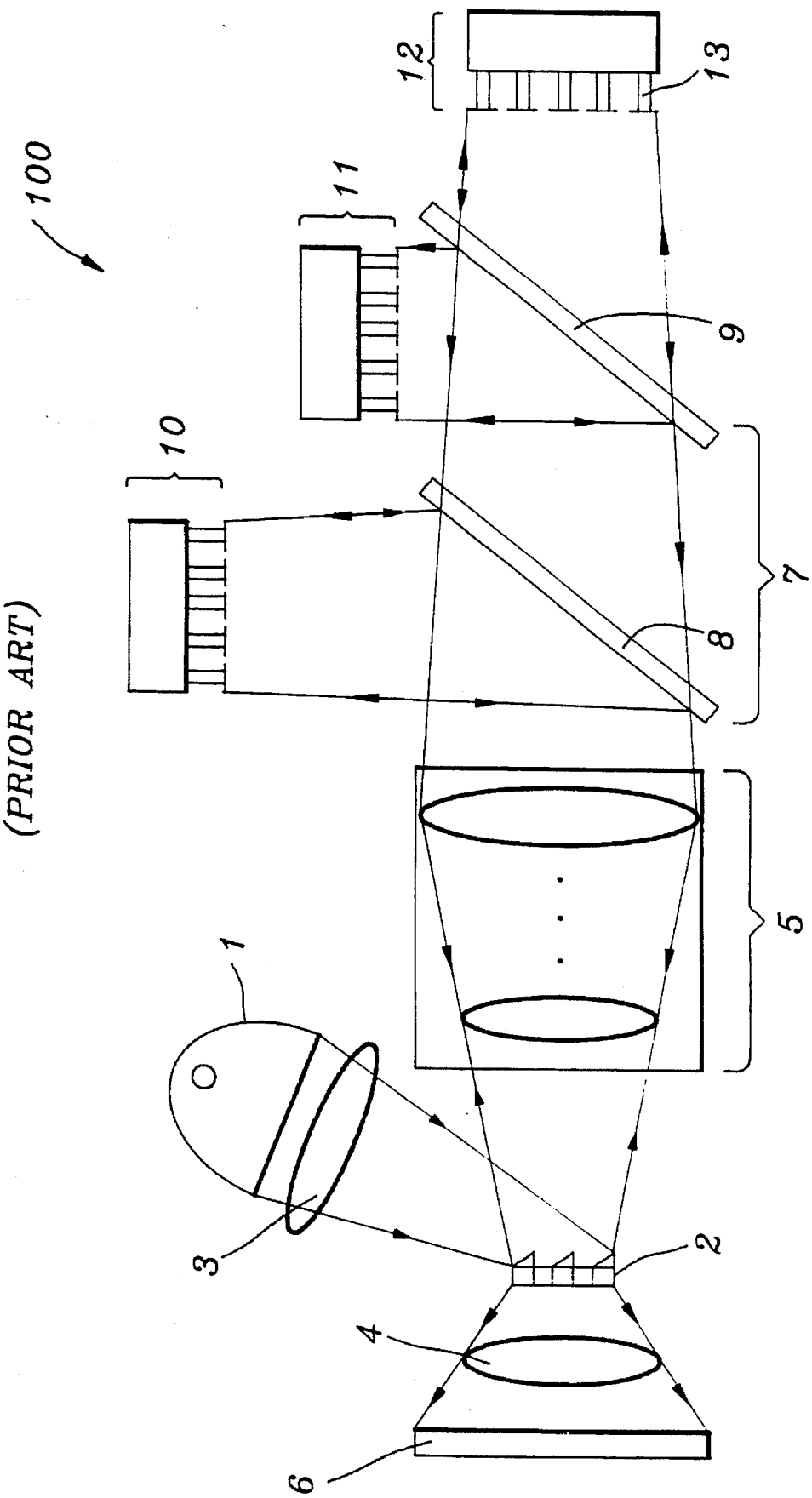
FIG. 1 represents a schematic view of a prior art optical projection system.
Figure 2:
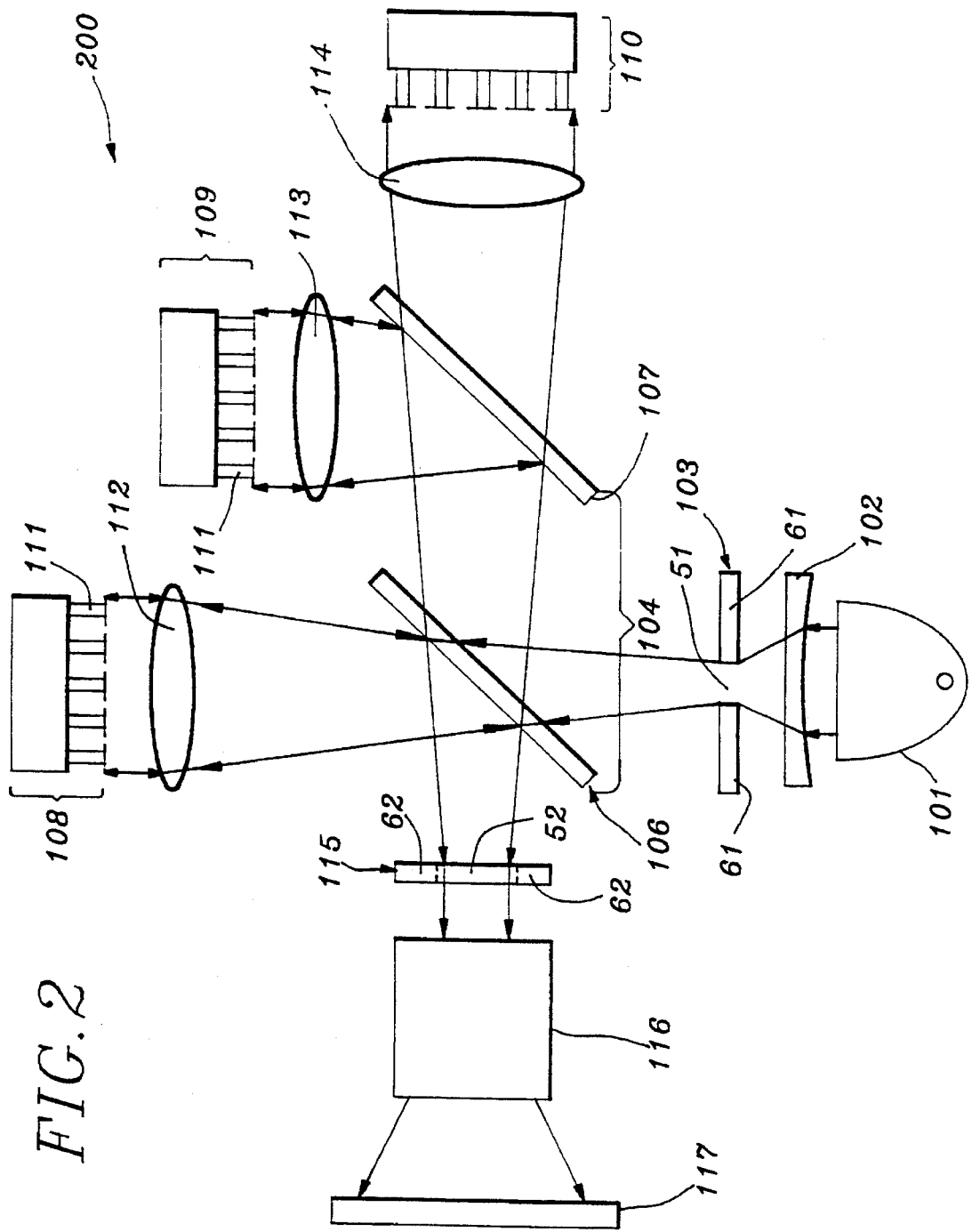
FIG. 2 illustrates a schematic view of an optical projection system in accordance with a preferred embodiment of the present invention.

Referring now to FIGS. 2 to 3, there are provided schematic views of the inventive optical projection system in accordance with preferred embodiments of the present invention. It should be noted that like parts appearing in FIGS. 2 to 3 are represented by like reference numerals.

In FIG. 2, there is illustrated a schematic view of the inventive optical projection system 200 comprising a non-point white light source 101, a source lens 102, a source stopper 103 provided with a light transmitting portion 51 having a specific configuration and a light stopping portion 61, an optical means 104 including a first and a second dichroic mirrors 106, 107, a trinity of arrays of M×N actuated mirrors 111 including a first, a second and a third arrays 108, 109, 110 of M×N actuated mirrors 111, a trinity of field lenses including a first, a second and a third field lenses 112, 113, 114, a projection stopper 115 provided with a light transmitting portion 52 having a specific configuration and a light stopping portion 62, a projection lens 116 and a projection screen 117.

In such a system, a white light emanating from the non-point white light source 101 is focussed along a first optical path on a first optical plane onto the light transmitting portion 51 on the source stopper 103 by the source lens 102 located between the non-point white light source 101 and the source stopper 103, wherein the white light consists of a first, a second and a third primary light beams, each of the primary light beams being one of the primary colors. The source stopper 103 is used for shaping the white light from the non-point white light source 101 via the source lens 102 into a predetermined configuration by allowing a certain portion of the white light to pass through the light transmitting portion 51 thereof. The white light from the source stopper 103 having the predetermined configuration travels onto the optical means 104, including the first and second dichroic mirrors 106, 107. The first dichroic mirror 106, inclined at an angle, e.g., 45° and disposed between the projection stopper 115 and the second dichroic mirror 107, receives the white light from the source stopper 103, isolates and transmits the first primary light beam of the white light to the first array 108 of actuated mirrors 111, and reflects the second and third primary light beams to the second dichroic mirror 107. The second dichroic mirror, inclined at an angle, e.g., 45° and disposed between the third array 110 of actuated mirrors 111 and the first dichroic mirror 106 facing the second array 109 of M×N actuated mirrors 111, upon receiving the second and third primary light beams from the first dichroic mirror 106, isolates and reflects the second primary light beam to the second array 109 of actuated mirrors 111, and transmits the third primary light beam to the third array 110 of actuated mirrors 111. The first dichroic mirror 106, as illustrated in FIG. 3 comprises a first and a second portions 24(a), 24(b). The first and second portions 24(a), 24(b) of the first dichroic mirror 106 are constructed in such a way that the first portion 24(a) thereof is capable of isolating, transmitting one of the primary light beams and reflecting the two remaining primary light beams onto the second dichroic mirror 107, and the second portion 24(b) thereof is used for reflecting the primary light beam reflected from the first array 108 of actuated mirrors 111 and for transmitting the two remaining primary light beams reflected from the second and third arrays 109, 110 of actuated mirrors 111 onto the projection stopper 115.

Each of the actuated mirrors 111 in the arrays 108, 109, 110 includes a mirror 53 and an actuator 54 made of a piezoelectric material or an electrostrictive material which deforms in response to an electric field applied thereto. Each of the actuated mirrors 111 in the arrays 108, 109, 110 corresponds to each of the pixels to be displayed.

Each of the first, second and third field lenses 112, 113, 114, located between the first dichroic mirror 106 and the first array 108 of actuated mirrors 111, the second dichroic mirror 107 and the second array 109 of actuated mirrors 111, and the second dichroic mirror 107 and the third array 110 of actuated mirrors 111, respectively, is used for collimating each of the primary light beams from each of the dichroic mirrors 106, 107 in the optical means 104 to thereby uniformly illuminating each of the primary light beams onto the corresponding array of actuated mirrors.

The optical path of the reflected primary light beams from each of the actuated mirrors 111 in each of the arrays 108, 109, 110 is determined by the amount of deflection thereof.

The reflected primary light beams from each of the undeflected actuated mirrors in each of the arrays 108, 109, 110 are focussed back to the projection stopper 115 by the corresponding field lens via the optical means 104 and the stopped by the light stopping portion 62 of the projection stopper 115 disposed between the projection lens 116 and the optical means 104, whereas the reflected primary light beams from each of the deflected actuated mirrors in each of the arrays 108, 109, 110 are focussed back to the projection stopper 115 by the corresponding field lens via the optical means 104, along a third optical path so that a portion of the focussed primary light beams passes through the light transmitting portion 52 of the projection stopper 115 to thereby modulating the intensity of the primary light beams.

In order for the primary light beams constituting the white light emitted from the non-point white light source 101 to form an image corresponding to an electrical signal on the projection screen 117, the optical path for each of the primary light beams between the optical means 104 and each of the arrays 108, 109, 110 of the actuated mirrors 111 must be of a same length. Furthermore, the optical path each of the primary light beams travels from the source stopper 103 to each of the arrays 108, 109, 110 of actuated mirrors 111 and from each of the arrays 108, 109, 110 of M×N actuated mirrors 111 to the projection stopper 115 must be of a same length. This is accomplished by placing the source and projection stoppers 103, 115 at the focal point of the field lenses 112, 113, 114 employed therein. In addition, the light density of the optical projection system 200 is at its highest when all of the white light that passed through the light transmitting portion 51 of the source stopper 103 passes through the light transmitting portion 52 of the projection stopper 115, and this can be accomplished by making the light transmitting portions 51, 52 of the source and projection stoppers 103, 115 identical in shape and size.

The primary light beams from each of the actuated mirrors 111 in the arrays 108, 109, 110 which pass through the light transmitting portion 52 of the projection stopper 115 located at the focal point of the field lenses 112, 113, 114 are transmitted to the projection lens 116 which, in turn, projects the transmitted primary light beams onto the projection screen 117, thereby displaying each of the pixels to be displayed.

Instead of employing a complicated field lens system 5 between the beam splitting means 7 and the Schlieren bar 2 as observed in the prior art optical projection system 100, the inventive optical projection system 200 employs the trinity of field lenses 112, 113, 114, each of the field lenses being located between the first dichroic mirror 106 and the first array 108 of actuated mirrors 111, the second dichroic mirror 107 and the second array 109 of actuated mirrors 111, and the second dichroic mirror 107 and the third array 110 of actuated mirrors 111, respectively. Under such an arrangement, each of the primary light beams becomes less divergent and has a smaller beam diameter, and therefore, can be easily focussed, thereby eliminating a need employ a complicated field lens system.

While the present invention has been described with respect to certain preferred embodiments only, other modifications and variations may be made without departing from the scope of the present invention as set forth in the following claims.

What is claimed is:

1. An optical projection system capable of displaying an M×N number of pixels, wherein M and N are integers, comprising:

a non-point white light source for emitting a white light along a first optical path on a first optical plane, wherein the white light consists of a first, second and a third primary light beams, each of the primary light beams being one of the primary colors;

a trinity of arrays of M×N actuated mirrors, including a first, a second and a third array of M×N actuated mirrors, each of the actuated mirrors having an actuator and a mirror attached thereto, each of the actuated mirrors in the arrays being capable of changing the optical path of the primary light beams reflected therefrom;

a source stopper, provided with a light transmitting portion having a specific configuration and a light stopping portion and being placed on the first optical path on the first optical plane, for shaping the white light from the non-point white light source into a predetermined configuration; a source lens, disposed between the source stopper and the non-point white light source, for focussing the white light emitted by the non-point white light source onto the source stopper;

an optical means including a first and a second dichroic mirrors, for isolating each of the primary light beams in the white light from the source stopper and illuminating each of the primary light beams to the corresponding array of actuated mirrors, wherein the first dichroic mirror, disposed between the source stopper and the first array of actuated mirrors facing the second dichroic mirror, is used for isolating one of the primary light beams, transmitting thereof to the first array of actuated mirrors and reflecting the remaining two primary light beams onto the second dichroic mirror disposed between the first dichroic mirror and the third array of actuated mirrors facing the second array of actuated mirrors, and the second dichroic mirror, upon receiving the remaining two primary light beams from the first dichroic mirror, isolates one of the two remaining primary light beams, reflects the isolated primary light beams onto the second array of actuated mirrors and transmits the remaining primary light beam to the third array of actuated mirrors;

a trinity of field lenses including a first, a second and third field lenses, each of the first, second and third field lenses being located between the first dichroic mirror and the first array of actuated mirrors, between the second dichroic mirror and the second array of actuated mirrors, and between the second dichroic mirror and the third array of actuated mirrors, respectively, wherein each of the field lenses is used for collimating each of the primary light beams onto the corresponding array of actuated mirrors and for refocussing each of the primary light beams reflected from each of the actuated mirrors in each of the arrays;

a projection screen for displaying an image made of the M×N number of pixels thereon; a projection stopper, provided with a light transmitting portion and a light stopping portion, for passing a predetermined amount of the reflected primary light beams from the trinity of the arrays of M×N actuated mirrors; and a projection lens for projecting the primary light beams from the projection stopper onto the projection screen, thereby displaying each of the pixels corresponding thereto.

2. The optical projection system of claim 1, wherein the first dichroic mirror in the optical means comprises a first and a second portion, wherein the first portion is capable of isolating one of the primary light beams, transmitting thereof to the first array of actuated mirrors and reflecting the two remaining primary light beams onto the second dichroic mirrors, and the second portion is used for reflecting the primary light beam reflected from the first array of actuated mirrors and for transmitting the two remaining primary light beams reflected from the second and third arrays of actuated mirrors via the second dichroic mirrors to the projection stopper.

3. The optical projection system of claim 1, wherein the light transmitting portion of the source stopper is identical to the light transmitting portion of the projection stopper in shape and in size.

4. The optical projection system of claim 1, wherein the source and projection stoppers are positioned at the focal point of the field lenses employed therein.

* * * * *